United States Patent [19]
Virkar et al.

[11] Patent Number: 5,543,239
[45] Date of Patent: Aug. 6, 1996

[54] ELECTRODE DESIGN FOR SOLID STATE DEVICES, FUEL CELLS AND SENSORS

[75] Inventors: Anil V. Virkar; Kuan-Zong Fung, both of Salt Lake City; Cameron W. Tanner, Springville, all of Utah

[73] Assignee: Electric Power Research Institute, Palo Alto, Calif.

[21] Appl. No.: 424,174

[22] Filed: Apr. 19, 1995

[51] Int. Cl.⁶ .................................................. H01M 8/10
[52] U.S. Cl. ................. 429/33; 429/40; 429/44; 429/193
[58] Field of Search .................... 429/30, 33, 40, 429/41, 193, 44, 45; 252/62.2; 427/115; 501/103, 104, 152; 204/421

[56] References Cited

U.S. PATENT DOCUMENTS

| | | | |
|---|---|---|---|
| 4,562,124 | 12/1985 | Ruka | 429/30 |
| 4,789,561 | 12/1988 | Schaefer et al. | 429/33 X |
| 4,851,303 | 7/1989 | Madou et al. | 429/33 X |
| 4,948,680 | 8/1990 | Madou et al. | 429/33 X |
| 5,006,494 | 4/1991 | Virkar | 429/193 X |
| 5,108,850 | 4/1992 | Carlson et al. | 429/40 X |
| 5,453,330 | 9/1995 | Kawasaki et al. | 429/30 |

Primary Examiner—Anthony Skapars
Attorney, Agent, or Firm—Phillips, Moore, Lempio & Finley

[57] ABSTRACT

An improved electrode design for solid state devices, fuel cells, sensors and the like is made by incorporation of a porous layer of the electrolyte material over the dense electrolyte, and by the introduction of an electrocatalyst into the porous layer such that it is also continuous. The resulting electrode structure of dense electrolyte/porous electrolyte, continuous electrocatalyst and gas phase are present creating an enhanced three phase (TPB) length over that of conventional designs. The design allows for improved performance at lower temperatures which means a lower cost of materials, fewer problems from oxidation and corrosion, and improved durability. In a preferred embodiment, the dense electrolyte and porous electrolyte is yttria-stabilized zirconia (YSZ), and the electrocatalyst is selected from silver; platinum; rhodium; palladium; iridium; ruthenium;

$(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90%, $PrO_{1.83}$ of 10–60% and $ZrO_2$ of 0 to 50%;

$TbO_2$ being 35 to 40% doped with YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca0.4MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

20 Claims, 10 Drawing Sheets

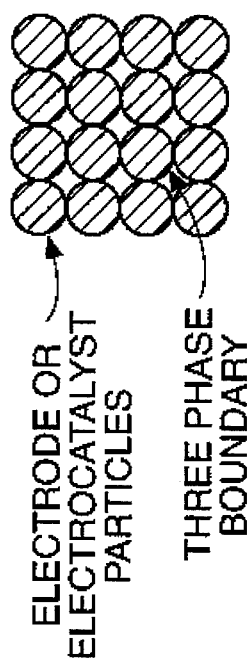
FIG._1B
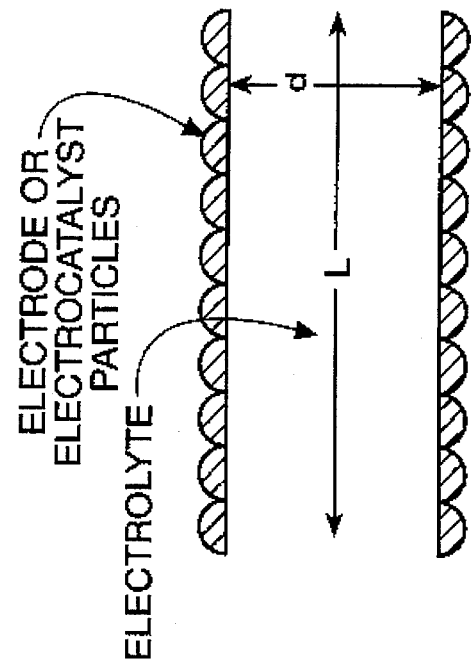
FIG._1C
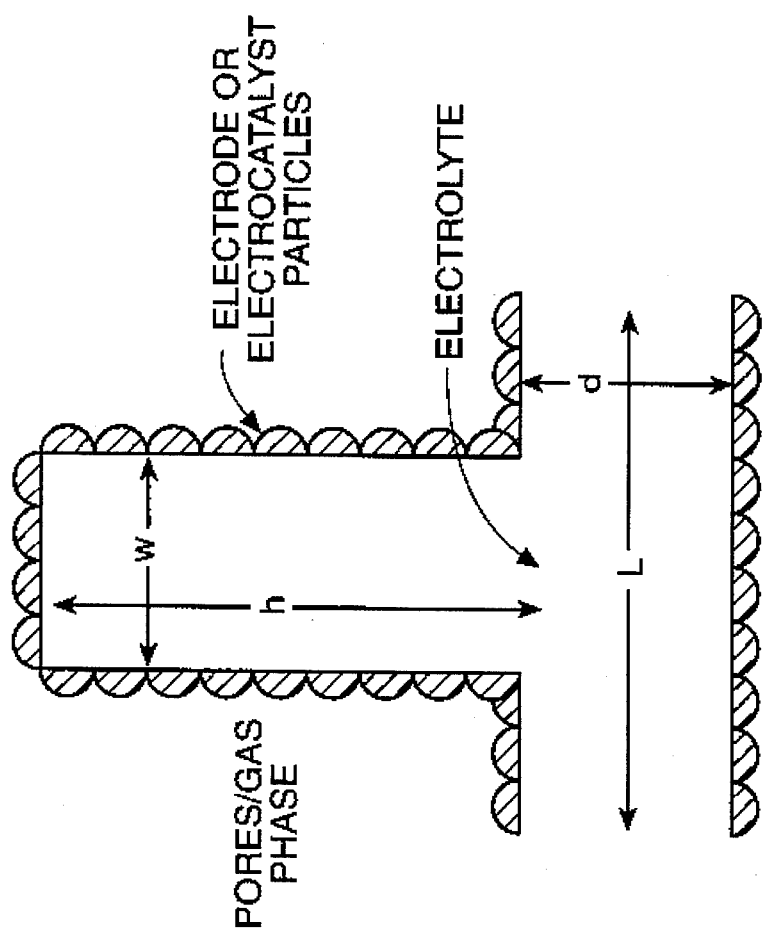
FIG._1A

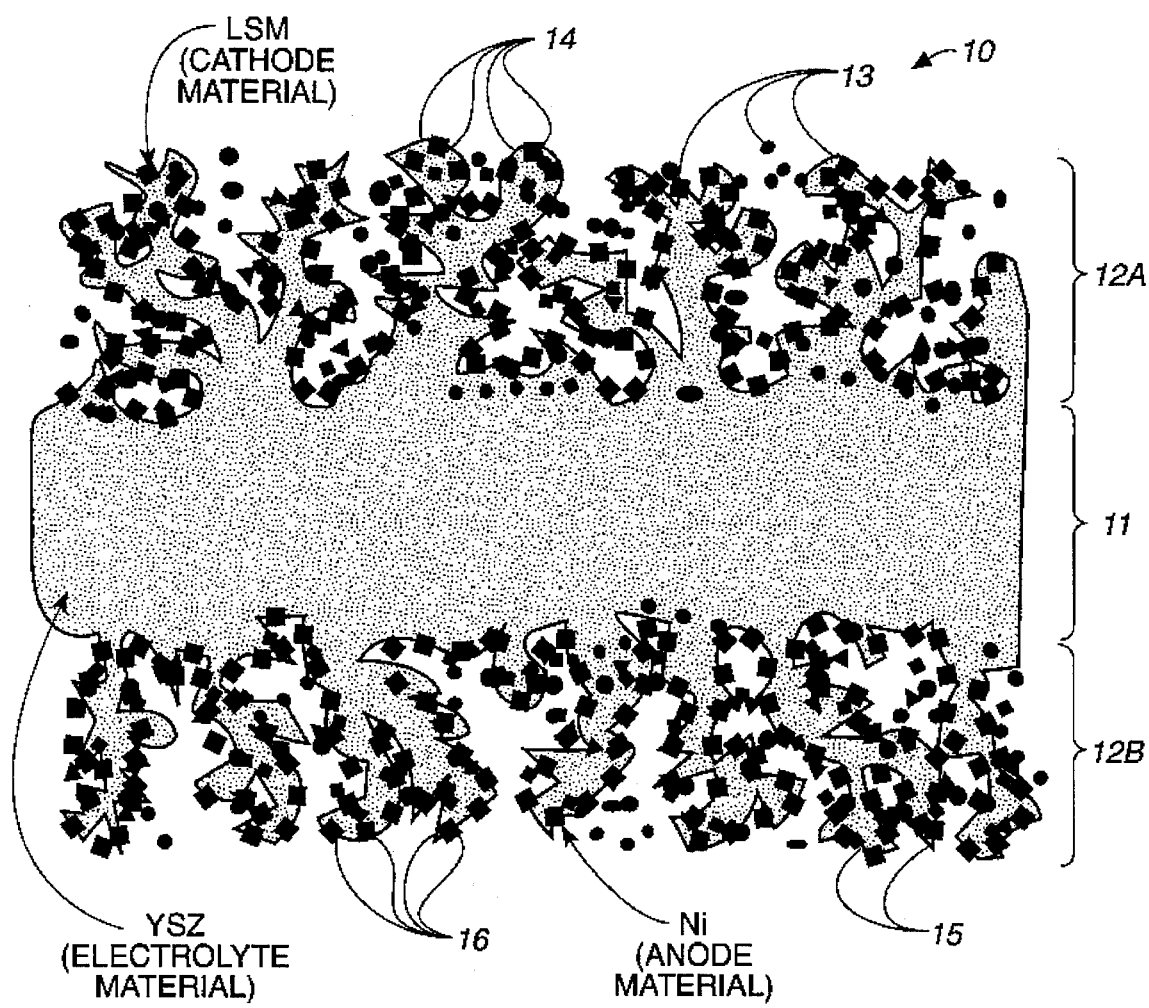
FIG._1D

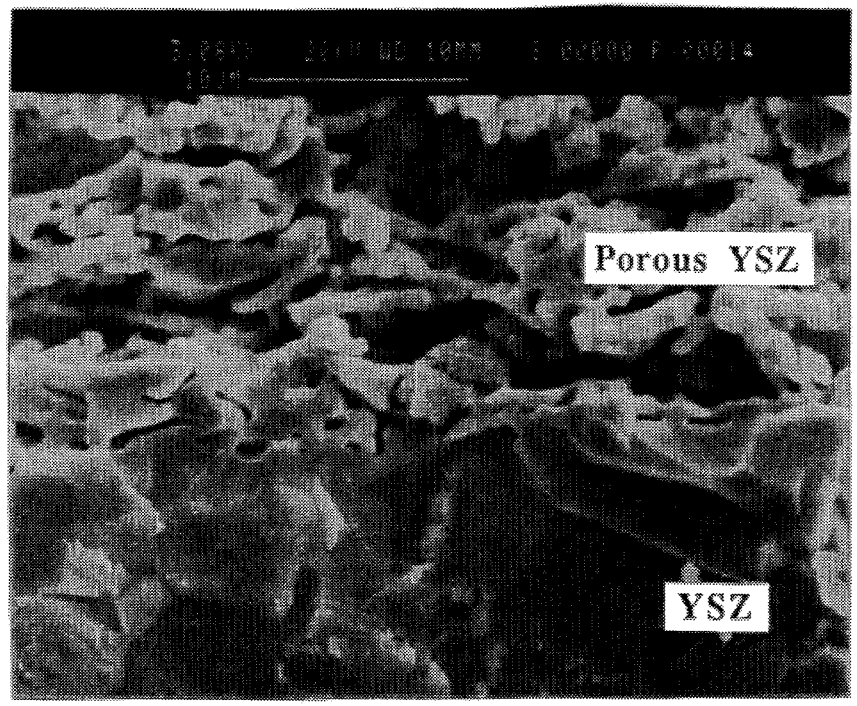
FIG._2
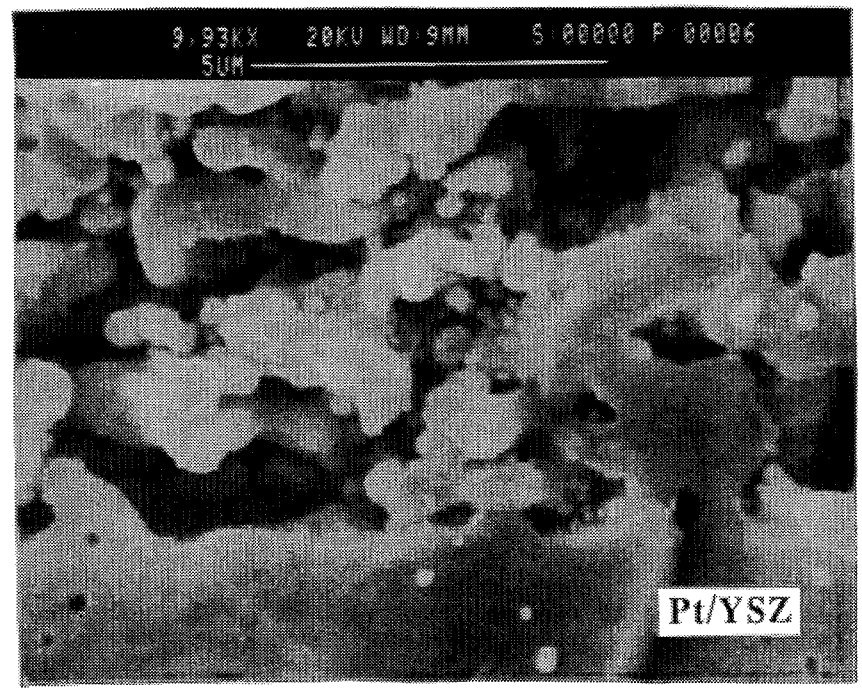
FIG._3

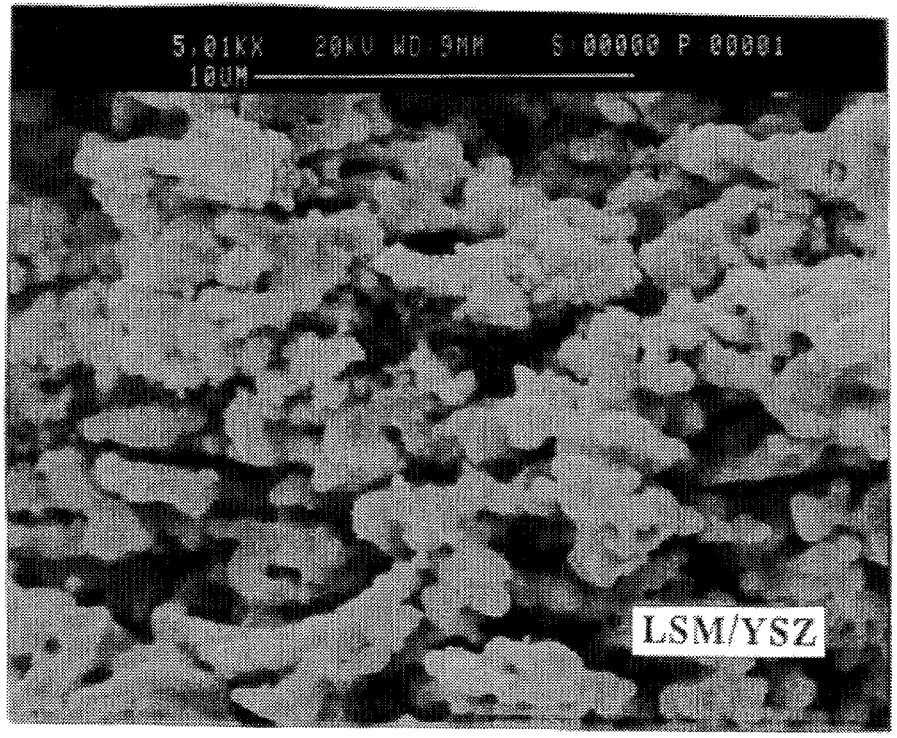
FIG._4
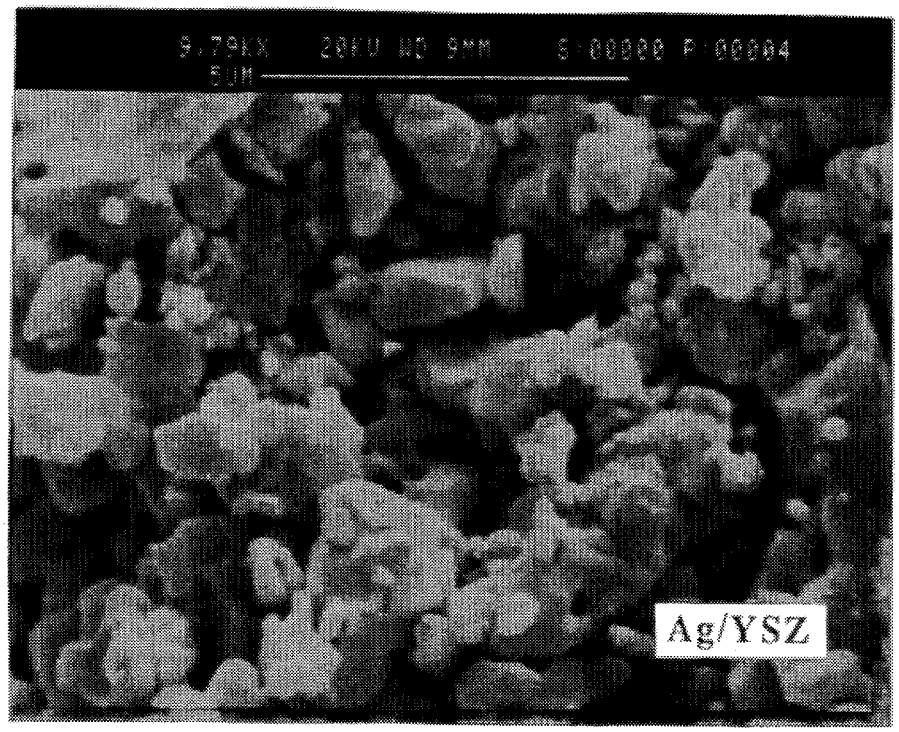
FIG._5

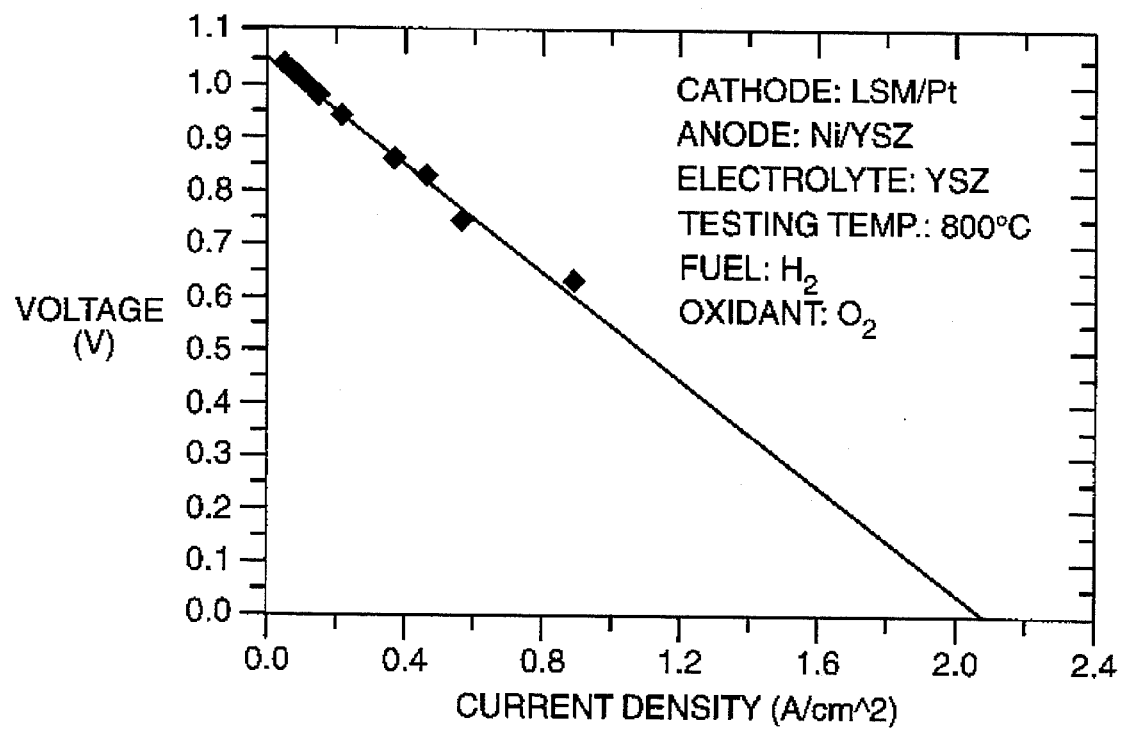
FIG._6A
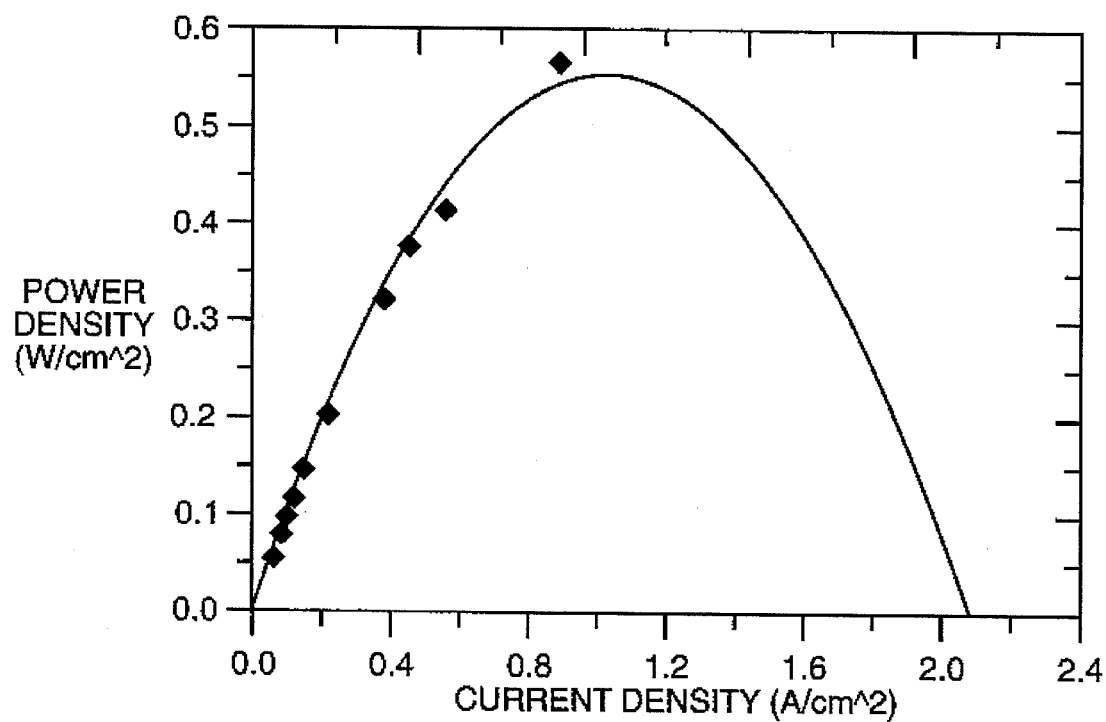
FIG._6B

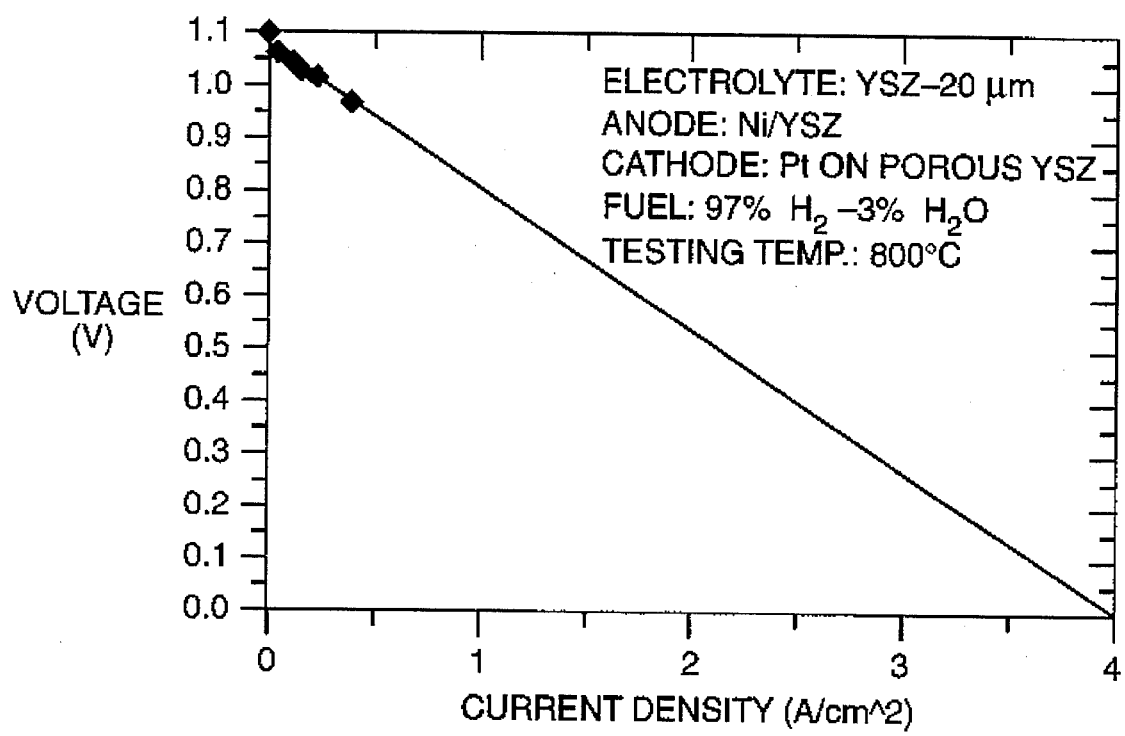
FIG._7A
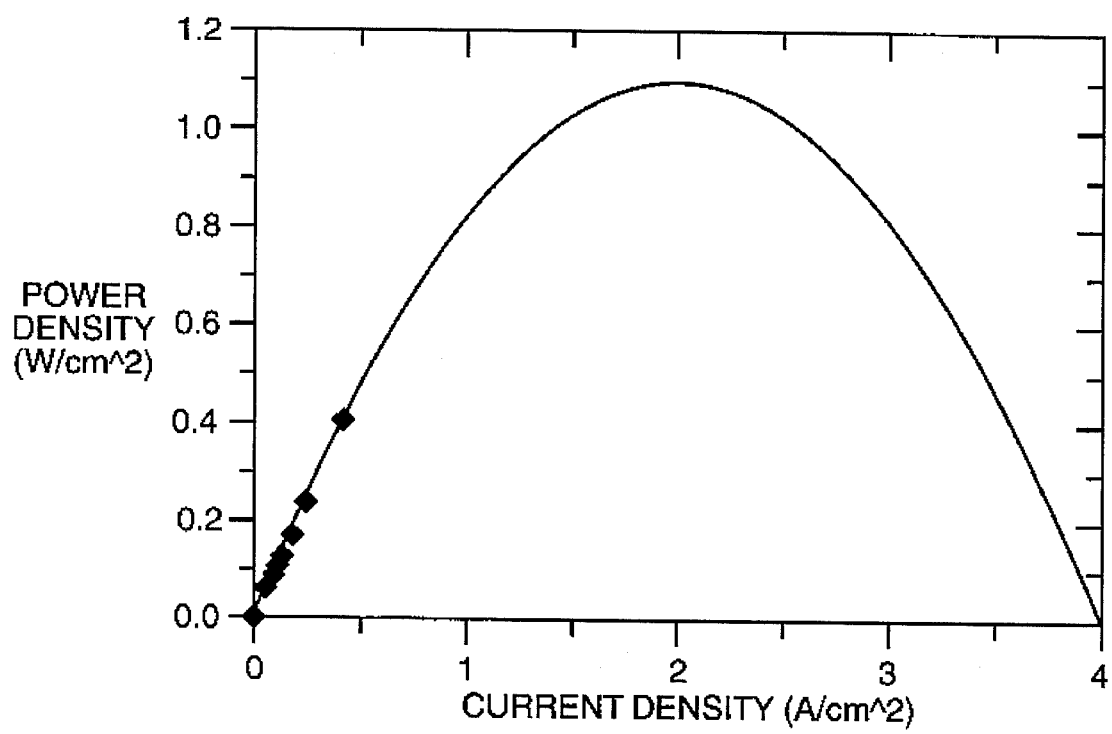
FIG._7B

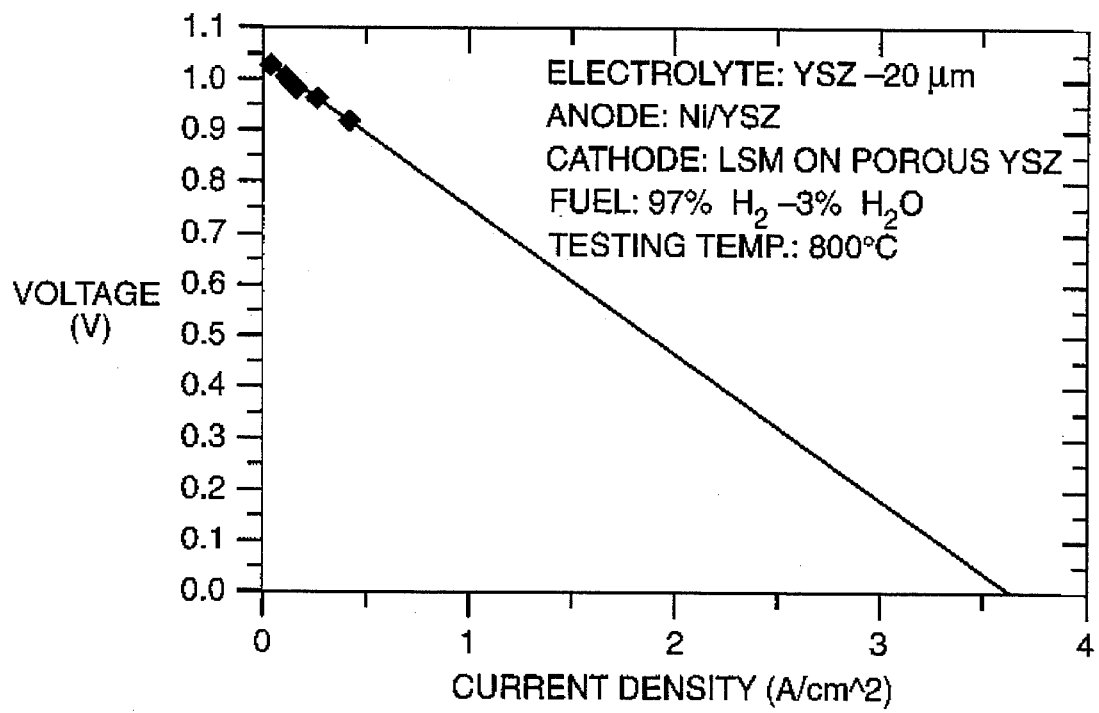
FIG._8A
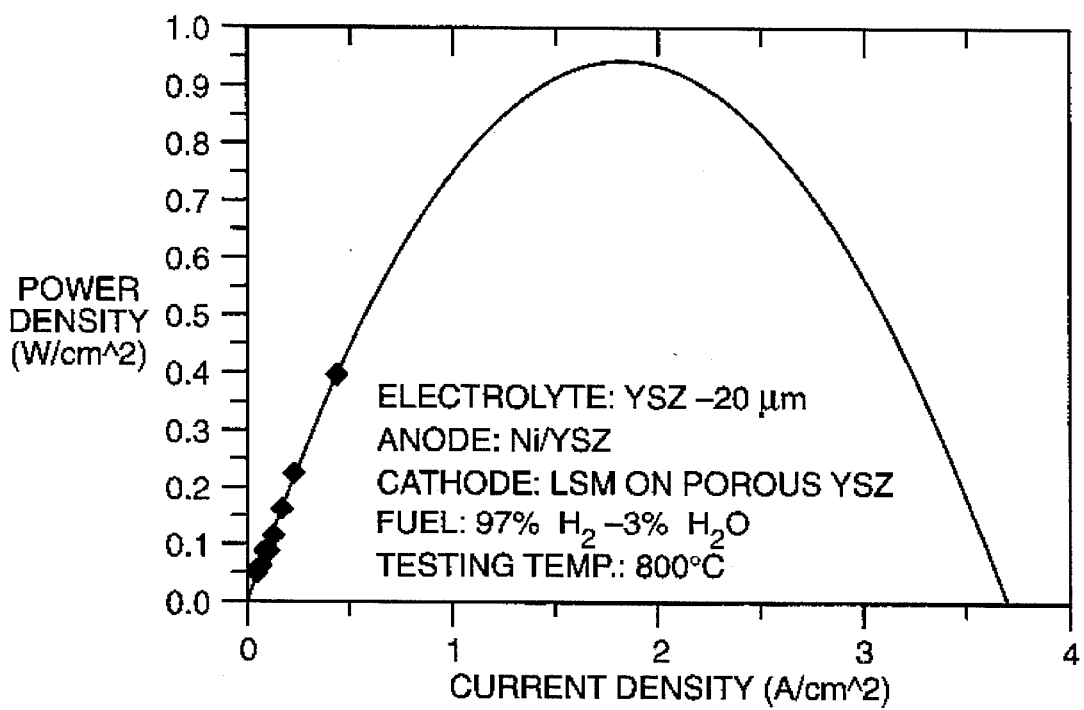
FIG._8B

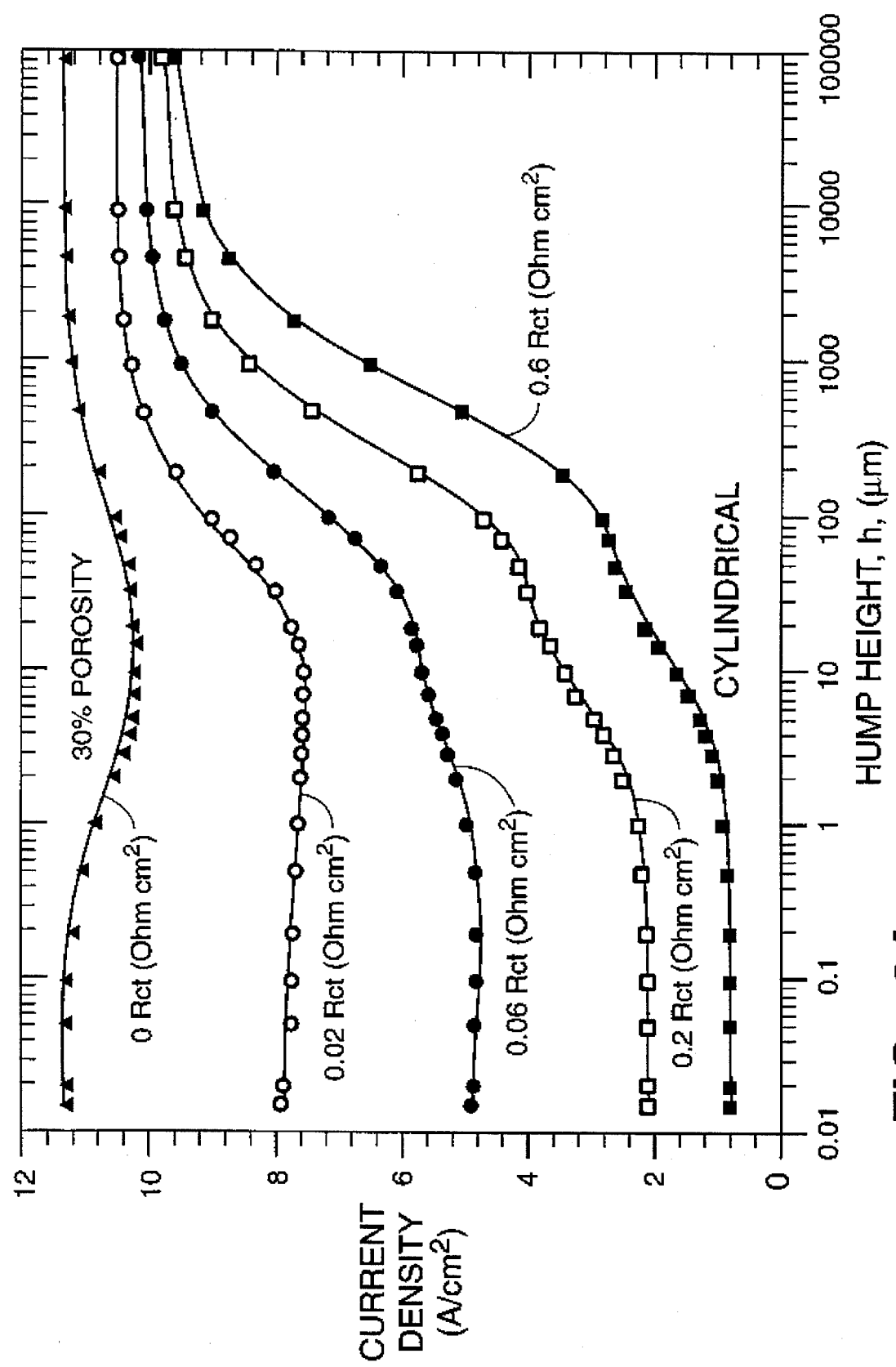
FIG._9A

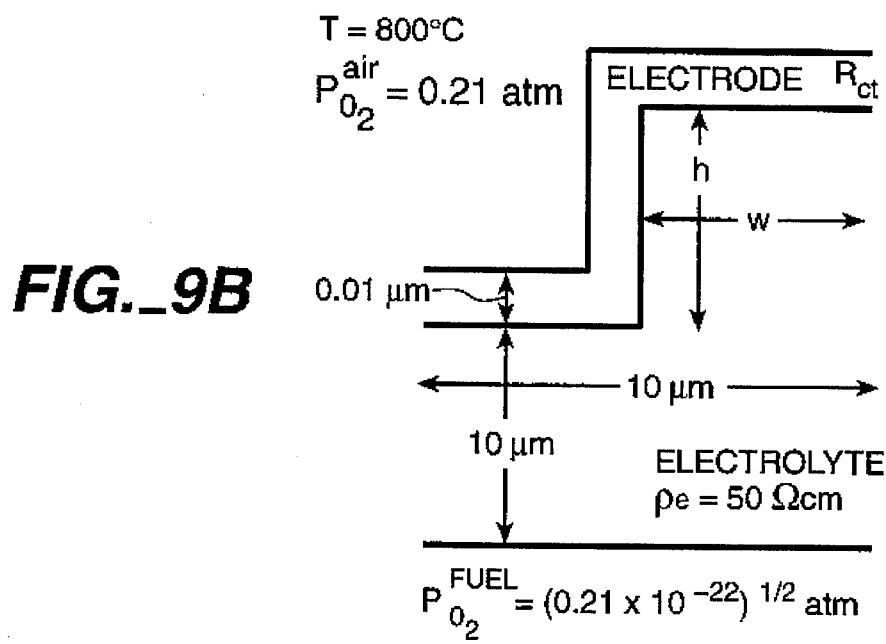
FIG._9B
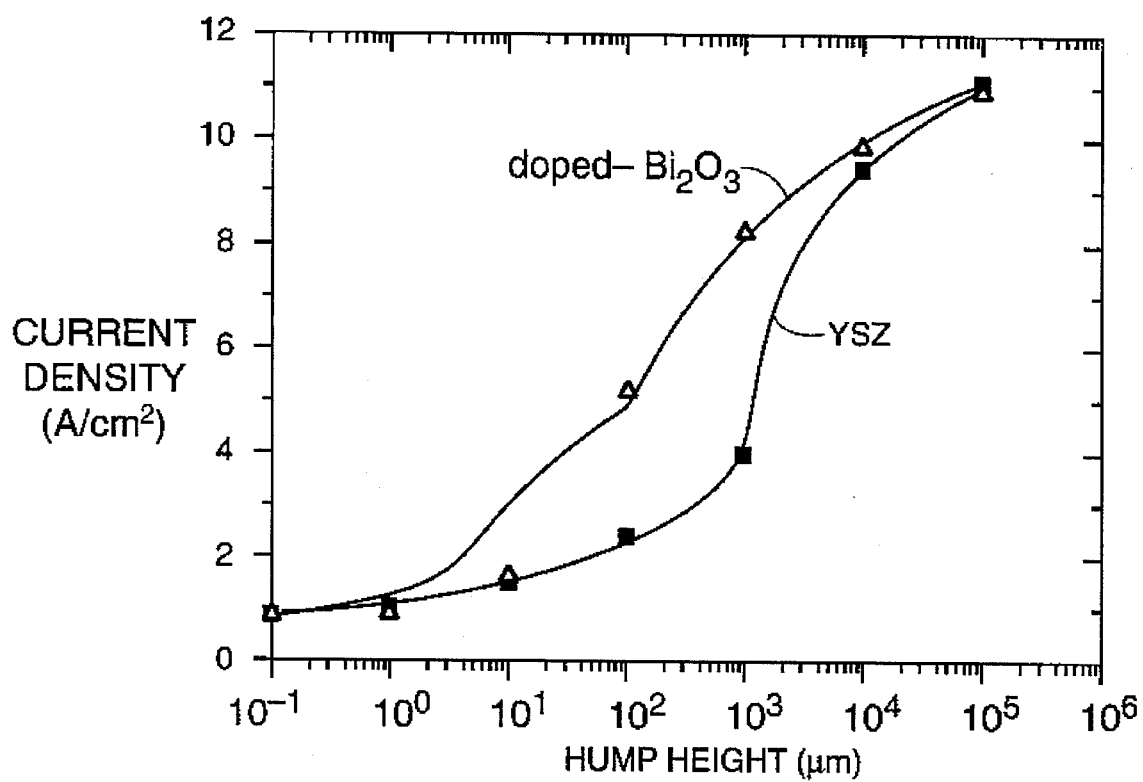
FIG._10

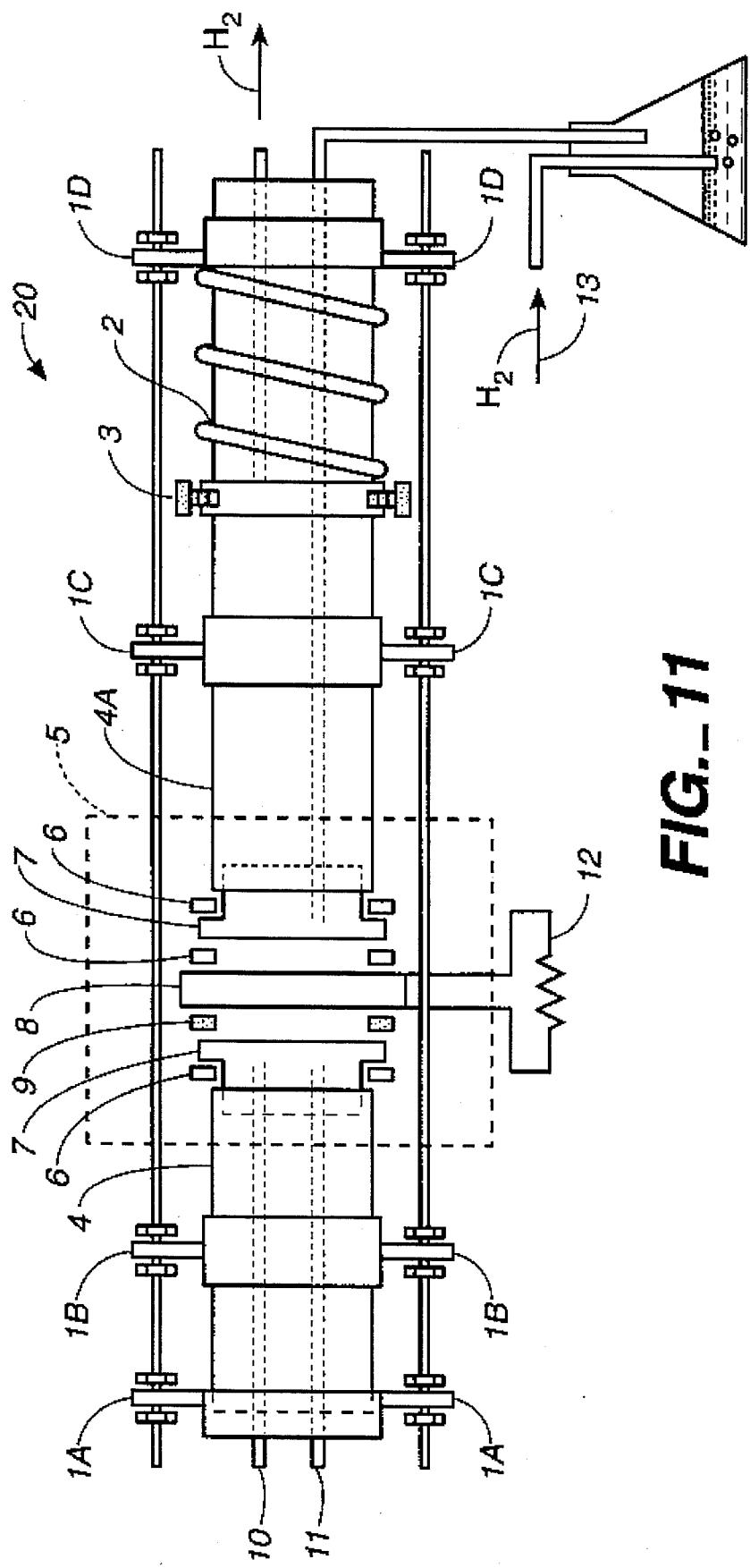
*FIG._11*

ELECTRODE DESIGN FOR SOLID STATE DEVICES, FUEL CELLS AND SENSORS

BACKGROUND OF THE INVENTION

1. Origin of the Invention

The present invention was developed with funding from the Electric Power Research Institute (EPRI) of Palo Alto, Calif., Grant No. RP 8002-30.

2. Field of the Invention

The present invention concerns an electrode design which incorporates a porous surface layer of an electrolyte material over a dense electrolyte and introduction of an electrocatalyst into the porous layer such that the electrocatalyst also is continuous. Thus, the resulting electrode structure consists of: 1) a continuous electrolyte (porous); 2) a continuous electrocatalyst; and 3) a continuous gas phase. This type of electrode structure enhances the three phase boundary (TPB) length between electrocatalyst, electrolyte, and gas phase where the charge transfer occurs as compared to conventional electrode designs. Although the path length through the electrolyte is increased, the overall area specific resistance is decreased as a result of the enhanced TPB length. In solid oxide fuel cells, this design leads to a lowering of the area specific resistance by more than a factor of two. This design leads to a substantial increase in the current and power densities that are achieved in the state-of-the-art solid oxide fuel cells (SOFCs). The new design also allows the operation of SOFCs at a lower temperature (800° C. vs. the current 1000° C.). Lower operation temperature means lower cost of materials and fewer problems related to oxidation and corrosion.

DESCRIPTION OF THE PROBLEM AND RELATED ART

It is known that the principal losses in most solid state electrochemical devices occur in the electrodes and/or at electrode/electrolyte interfaces. It is also recognized that minimization of these losses, which arise from either concentration polarization or activation polarization or both, is crucial to the efficient operation of these devices. For example, minimization of these losses is central to obtaining high current and power densities in solid oxide fuel cells.

It is generally recognized that high three phase boundary length in the electrode/electrolyte interface is necessary to achieve good electrode performance. Despite this, general design of high performance electrode structures has not occurred. As a general design of electrode structures, an approach in which the electrode material is mixed along with the electrocatalyst material has been tried and, as described below, has proven to be an effective means of greatly enhancing electrode performance.

A number of approaches have been examined to obtain high current and power densities. Some references of general and specific interest are:

W. Schaefer et al, in U.S. Pat. No. 4,789,561 disclose solid compositions for fuel cell electrolytes.

T. Otagawa et al, in U.S. Pat. No. 4,948,680 disclose solid compositions for fuel cell electrolytes wherein the coating is discontinuous in forming the three phase boundary.

M. J. Madou, et al., in U.S. Pat. No. 4,851,303 disclose solid compositions for fuel cell electrolytes wherein the discontinuous coating is of a different material than the solid center.

None of these references individually or collectively teach or suggest the present invention.

All patents, applications, references, articles, standards and the like cited in this application are incorporated by reference in their entirety.

It is apparent from this description that improved designs can improve the performance and output of materials used as catalysts, sensors or fuel cells. The present design as described herein is a systematic approach to designing efficient electrodes by addressing the central issue of minimizing the total electrode losses due to charge transfer at the three phase boundary (TPB).

SUMMARY OF THE INVENTION

The present invention concerns an improved electrode/electrolyte structure having an enhanced three phase boundary (TPB) length for use as a fuel cell, a catalyst or a sensor, wherein said structure comprises:

A. a dense electrolyte substrate;

B. a porous surface layer also of the dense electrolyte material or another electrolyte conducting the same ionic species; and C. an electrocatalyst material on and within the porous surface layer of electrolyte, wherein the electrocatalyst material is continuous on the surface of the porous electrolyte to create the TPB with the gas present, wherein said structure is integrally connected or attached to a porous anode.

In a preferred embodiment of the improved electrode structure the dense electrolyte substrate in the center is between about 1 and 1000 micron thick, more preferably the dense electrolyte substrate is present in between 2 and 500 microns, and the porous surface electrolyte layer is present having a thickness of between about 1 and 10,000 micron.

In a preferred embodiment of the improved electrode structure, the dense electrolyte structure and the porous electrolyte structure are yttria-stabilized zirconia, ceria, oxygen ion conducting solid electrolyte or combinations thereof, and the electrocatalyst material at the cathode is a metal such as silver; platinum; palladium; rhodium; or a metal oxide selected from:

$(La_{1-x}Sr_x) MnO_3$, wherein x is 0 to 0.5;

$(La_{1-x}Sr_x) CoO_3$, wherein x is 0 to 0.6;

$(La_{1-x})(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90%, $PrO_{1.83}$ of 10–60% and $ZrO_2$ of 0 to 50%;

$TbO_2$ being 35 to 40%, doped with YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

In another embodiment of the present invention, the improved electrode with regard to FIGS. 1A, 1B, 1C, and 1D has:

the height of the thickness of the porous layer designated as h, the thickness of the baseline dense electrolyte substrate is designated as d, the length of a segment of the baseline dense electrolyte substrate is designated as L, and the width of the porous layer hump is designated as w, and that the effective fractional porosity (EFP) of the porous layer is determined by the following equation:

$$EFP = \frac{L-w}{L} \times 100$$

and that EFP is between about 5% and 95%, preferably between about 5 and 80%.

In a preferred embodiment of the specific materials of the improved electrode structure, the dense electrolyte substrate is between about 1 and 1000 micron thick, more preferably the dense electrolyte substrate is present in between 2 and 500 microns, and the porous surface layer is between about 1 and 10,000 micron, preferably between about 1 and 2000 micron.

In a preferred embodiment, the improved electrode structure includes the dense electrolyte structure and the porous electrolyte structure comprising yttria-stabilized zirconia, and the electrocatalyst material is selected from a metal such as silver; platinum; palladium; rhodium; iridium; or ruthenium;

or a metal oxide, such as $(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90%, $PrO_{1.83}$ of 10–60% and $ZrO_2$ of 0 to 50%;

$TbO_2$ being 35 to 40%, doped YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

Another embodiment of the present invention is an improved method to produce an electrode structure having a three phase boundary (TPB) for use in a fuel cell, a catalyst, or a sensor, wherein said method comprises:

A. obtaining first a transition metal oxide having a particle size of about 200 mesh or smaller;

B. obtaining second a mixed metal compound having a particle size of about 200 mesh or smaller;

C. combining and mixing the metal oxide of step A and mixed metal compound of step B;

D. pressing the combination of the powders of step C to produce a self-containing essentially solid object at a pressure of between about 5,000 and 50,000 psig at ambient temperature;

E. coating the surface of the solid object of step D with an aqueous or non-aqueous slurry of the electrolyte powder of step B;

F. pressing the coated object of step E at a pressure between about 5,000 and 50,000 psig.

G. drying or further coating the coated object of step F with an aqueous or nonaqueous slurry of carbon and the electrolyte powder of step B;

H. drying the coated object of step E or step G;

I. pressing the object of step H at a pressure between about 5,000 and 50,000 psig;

J. slowly heating up the object of step I to between about 600° and 1000° C. at a rate of between about 10° C. and 60° C. per hr;

K. maintaining the object of step J at between about 600° and 1000° C. for between about 1 and 60 hours to remove the carbon present creating the porous exterior surface;

L. heating further the object of step K and sintering between about 1400° and 1600° C. for between about ½ and 3 hr;

M. slowly cooling the object of step L to ambient conditions producing an object having three regions each having a different structure and composition which comprise:

(i) an upper surface porous layer of the electrolyte material;

(ii) a central fully dense layer of the electrolyte material; and (iii) a lower layer of a two phase ceramic of metal oxide and electrolyte material; and N. introducing an electrocatalyst into the pores as an aqueous solution of salts or a nonaqueous solution of salts and heating the object to between about 700° to 1000° C. to form the electrode structure.

In a preferred embodiment of the present invention, wherein the method further includes step O:

O. contacting the object of step M with hydrogen to reduce the metal oxide residue of step N at between about 700° and 1000° C. for between about ½ and 24 hr.

BRIEF DESCRIPTION OF THE FIGURES

FIG. 1A is a schematic cross-sectional representation of the device of the present invention showing the porous electrode, electrocatalyst and gas phase.

FIG. 1B is an enlarged schematic representation of the three phase boundary (TPB) of porous electrode, electrocatalyst and gas phase.

FIG. 1C is a schematic cross-sectional representation of the porous electrolyte of the electrode, electrocatalyst particles, the dense electrolyte and gas.

FIG. 1D is a schematic cross-sectional representation of a more realistic porous electrolyte of the electrode, electrocatalyst particles, dense electrolyte and gas.

FIG. 2 is a scanning electronmicrograph of the surface of a porous yttria-stabilized zirconia (YSZ)/fully dense YSZ film/anode assembly. Bar=10 micron.

FIG. 3 is a scanning electronmicrograph at the surface of the electrode showing the Pt particles in the porous YSZ layer. Bar=5 microns.

FIG. 4 is a scanning electron micrograph showing LSM particles in the porous YSZ layer. Bar=10 micron.

FIG. 5 is a scanning electron micrograph showing silver particles in the porous YSZ layer. Bar=5 microns.

FIG. 6A is a graphic representation of the voltage (V) versus current density (A/cm$^2$) at 800° C. for a cathode without a porous YSZ layer of LSM/Pt, anode of Ni/YSZ, electrolyte YSZ using H$_2$ as fuel and oxygen as oxidant.

FIG. 6B is a graphic representation of the power density (W/cm$^2$) versus current density (A/cm$^2$) without a porous YSZ layer under the conditions of FIG. 6A.

FIG. 7A is a graphic representation of the voltage (V) versus current density (A/cm$^2$) for a cathode with a porous YSZ layer having a platinum cathode having an electrolyte of YSZ (about 20 micron), anode of Ni/YSZ, cathode of platinum on porous YSZ, having a fuel of 97% hydrogen and 3% water, at 800° C.

FIG. 7B is a graphic representation of power density (W/cm$^2$) versus current density (A/cm$^2$) with a porous YSZ layer under the conditions of FIG. 7A.

FIG. 8A is a graphic representation of voltage (V) versus current density (A/cm$^2$) of an electrolyte having a porous YSZ layer (and LSM-cathode) having an electrode of a YSZ layer of about 20 microns, an anode of Ni/YSZ, a cathode of LSM on porous YSZ, having a fuel of 97% hydrogen and 3% water at 800° C.

FIG. 8B is a graphic representation of power density (W/cm$^2$) versus current density (A/cm$^2$) with a porous YSZ layer (and LSM cathode) under the conditions of FIG. 8A.

FIG. 9A is a graphic representation of the calculated current density (A/cm$^2$) versus Hump Height, h(μm) for various values of charge transfer resistance, $R_{et}$, for a cylindrical electrode/electrolyte device at 30% porosity, as calculated theoretically under short circuit conditions for the model shown in FIG. 9B.

FIG. 9B is a diagrammatic representation of the electrode/electrolyte device for which the LaPlace equation was solved to obtain the curves in FIG. 9A.

FIG. 10 is a graphic representation of the calculated current density (A/cm$^2$) plotted versus Hump Height, h(μm) for a YSZ (50 Ohm cm$^2$) layer, and $Bi_2O_3$ doped with $Y_2O_3$ 0.5 Ohm cm) layer device at 10% porosity.

FIG. 11 is a graphic representation of the fuel cell testing apparatus.

DETAILED DESCRIPTION OF THE INVENTION AND PREFERRED EMBODIMENTS

Definitions

As used herein,

"Dense electrolyte" refers to the center of the solid electrolyte.

"Porous electrolyte" or alternatively "porous electrode" refers to the porous outer surface of solid electrolyte. It is the same material as the electrolyte, or may be of another electrolyte which is capable of transporting the same ionic species as the electrolyte. Preferred materials include yttria-stabilized zirconia (YSZ), ceria, bismuth oxide, hafnia, certain perovskites, and the like.

"Electrocatalyst" refers generally to metals such as silver; platinum; palladium; rhodium; iridium; or ruthenium; or metal oxides, such as $(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90%, $PrO_{1.83}$ of 10–60% and $ZrO_2$ of 0 to 50%;

$TbO_2$ being 35 to 40% doped with YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

The process of charge transfer occurs only at three phase boundaries (TPBs) between the electrolyte, the gas phase, and the electrode or electrocatalyst particle. Thus, the TPB line length per unit area of the electrode/electrolyte interface should be as large as possible. This interface depends upon the particle size of the electrode or electrocatalyst; the smaller the particle, the greater the TPB line length. Usually, it is not possible to increase the TPB length beyond some value because it is not possible to decrease the particle size below some value. Even if very small particles are used, they usually fuse and coarsen at elevated temperatures, thereby resulting in a loss of electrode activity.

For effective charge transfer to occur, the gas phase, the electrolyte, and the electrode or electrocatalyst material must all be contiguous while still maintaining high TPB length. However, it is not possible to achieve this objective by utilizing the planar electrode/electrolyte interface known in the present art.

To achieve the novel result, the following steps are performed. First, construct a porous but a contiguous layer of the electrolyte material on the dense electrolyte center. Next, the electrode or electrocatalyst particles are introduced into the pores in such a manner that they are in contact with each other thus providing electrical continuity while still maintaining large TPB line length. Finally, even after the introduction of the electrode or electrocatalyst, there should be sufficient porosity in the electrode for gaseous species to move in and out relatively freely. A key point is that the porous layer must be the same as the dense electrolyte and not of some other material. However, as an exception in one embodiment, the porous layer is of some other electrolyte material which is capable of transporting the same ionic species as the electrolyte. For example, in conventional catalysis where all that is required is large surface area, the catalyst is deposited on fine alumina. Such a combination is not acceptable here since alumina does not conduct oxygen ions at a reasonable temperature. An appropriate material for the porous layer is yttria-stabilized zirconia (YSZ) for solid oxide fuel cells, for example. The other aspect is that the electrocatalyst or electrode particles must be in contact to ensure electrical contiguity. In conventional catalysis, the catalyst particles need not be in contact, in fact they should not be in contact to ensure high surface area. These are the fundamental considerations in electrode design.

A schematic of the new electrode concept is shown in FIG. 1A. Only one interface is shown in the schematic with a porous layer although both interfaces may be made porous. Height h is the thickness of the porous layer, the dimension d denotes the thickness of the baseline dense electrolyte layer, and (L-w)/k is effectively the fractional porosity in the porous layer. The electrode or electrocatalyst particles are shown shaded. FIG. 1B is a schematic which shows how the projection of the electrode/electrolyte interface (either planar or on the protrusion of height h) appears. Note that the particles are in contact with each other. At the same time, sufficient electrolyte area is exposed and the three phase boundary is identified. FIG. 1C is a schematic showing the conventional approach.

When the principal losses occur at the electrode/electrolyte interfaces in the form of activation polarization, which is usually the case, the overall charge transfer resistance is minimized by using the above design which the path length through the electrolyte is actually increased (thus increasing the electrolyte resistance) over that for a planar interface, but the charge transfer resistance is decreased on account of the increased TPB line length. The concept is schematically shown in FIGS. 1A, 1B and 1C. With reference to FIGS. 1A, 1B and 1C, if the resistance for charge transfer, which occurs only at a TPB, is greater than the electrolyte resistance, the overall resistance for the geometry in FIG. 1A will be lower than that for FIG. 1B despite the fact that the electrolyte is thicker in FIG. 1A. This is because the effective TPB line length per unit area is higher in FIG. 1A as compared to that in FIG. 1C. Theoretical calculations recently conducted are in accord with this hypothesis.

FIGS. 1A, 1B, 1C and 1D show various cross-sectional view of the porous electrode configuration (10). The solid electrolyte center 11 is usually coated on both flat sides (surfaces) with the porous electrolyte 12A and 12B. The cathode material 13 is at the top side of FIG. 1D, and the anode material 15 is at the lower side of configuration 10. The multiple three phase boundaries are shown at the top side as points 14 and on the lower side of configuration 10 as points 16.

As stated previously, the porous electrolyte layer of the electrode may be of a different material from that of the dense electrolyte, but must be capable of transporting the same ionic species as the electrolyte. One such material is stabilized $Bi_2O_3$. Much advantage can be gained, as shown in the graphic representation of FIG. 10. By making the porous layer of stabilized $Bi_2O_3$ over the center electrolyte layer of YSZ. The $Bi_2O_3$ stabilized by the additions of rare earth oxides, such as $Yb_2O_3$, $Er_2O_3$, $Gd_2O_3$, $Dy_2O_3$, and the like, or $Y_2O_3$, or alkaline earth oxides such as BaO, CaO or SrO. The oxide stabilizer is added in amounts between about 5% and 40%. The porous stabilized $Bi_2O_3$ layer is introduced along with the electrocatalyst such as $(La_{1-x}Sr_x)MnO_3$, upon already sintered YSZ electrolyte/metal oxide+YSZ assembly. The porous stabilized $Bi_2O_3$ layer and electrocatalyst is introduced after sintering the YSZ electrolyte/metal oxide and YSZ assembly at or above 1400° C. This is because the $Bi_2O_3$ can only be heated to about 1100° C.; above 1100° C. $Bi_2O_3$ melts destroying the crystal structure.

The following Examples are provided to be illustrative and descriptive only. They are not to be construed to be limiting in any way or manner.

EXAMPLE 1

CELL FABRICATION (a) Powder mixtures with a composition of 60 v/o NiO and 40 v/o YSZ are ball-milled in ethanol for 24 h. After drying in air, the mixtures are sieved through a 200-mesh nylon screen. Subsequently, the powder is die-pressed to form green pellets. The green pellets are dip-coated with YSZ-alcohol slurry. After drying in air for 12 h, the 2-layered pellets are isostatically pressed under a pressure of about 200 MPa. The pressed pellets are then coated with carbon-YSZ slurry. After drying for another 12 h, the pellets are isostatically pressed again. The pellets are then slowly heated up to 900° C. to burn off carbon and organic binders. The pellets are finally sintered at 1450° C. for 2 h. The sintered cell consists of 3 layers of ceramic with different structures and compositions. The top layer has a porous YSZ structure which is to be exposed to air or pure oxygen and is the eventual cathode. The central layer is a fully dense YSZ which is the electrolyte. The bottom anode layer is a two-phase ceramic with 60 v/o NiO and 40 v/o YSZ, which is later reduced in hydrogen at 800° C. to form the anode consisting of Ni and YSZ.

(b) Similarly, when Example 1(a) is repeated except that YSZ is replaced with an equivalent amount $Yb_2O_3$-doped zirconia, $Sc_2O_3$-doped zirconia, rare earth oxide doped (CeO_2, alkaline earth oxide doped $CeO_2$ or a perovskite, the corresponding useful porous/dense/porous electrolyte configuration is obtained.

(c) Similarly, when Example 1(a) is repeated except that the nickel oxide is replaced with an equivalent amount of cobalt oxide, iron oxide, ruthenium oxide, or mixtures thereof, the corresponding useful porous/dense/porous electrolyte configuration is obtained.

EXAMPLE 2

CATHODE PREPARATION: (a) Pt Cathode (a) Pt resonate is diluted with toluene. The diluted solution is impregnated in the porous YSZ side of the sintered cells of Examples 1(a). In order to convert Pt resonate into fine Pt particles, the cell assembly is heated to 800° C. for several hours in air. This process is repeated several times to be certain that Pt particles cover most of the free space and are in contact with each other.

(b) Similarly, when Examples 1(a) and 2(a) are repeated except that YSZ is replaced with an equivalent amount $Yb_2O_3$-doped zirconia, $Sc_2O_3$-doped zirconia, rare earth oxide doped $CeO_2$, alkaline earth oxide doped $CeO_2$, or a perovskite, the corresponding useful porous/dense/porous electrolyte configuration is obtained.

(c) Similarly, when Examples 1(a) and 2(a) are repeated except that the nickel oxide is replaced with an equivalent amount of cobalt oxide, iron oxide, ruthenium oxide, or mixtures thereof, the corresponding useful porous/dense/porous electrolyte configuration is obtained.

EXAMPLE 3

LSM CATHODE (a) Fine LSM particles are prepared from lanthanum, strontium, and manganese nitrates. The nitrates in a desired ratio (lanthanum 51.26 wt %, strontium 6.26 wt %, and manganese 42.48 wt %) are first dissolved in water. The solution is then impregnated in the porous YSZ side of the sintered cells. After drying in air for 1 hr, the cells are heated up to 1100° C. to form fine LSM particles. Similarly, this process is repeated several times.

(b) Similarly, when Examples 1(a), 2(a) and 3(a) are repeated except that YSZ is replaced with an equivalent amount $Yb_2O_3$-doped zirconia, $Sc_2O_3$-doped zirconia, rare earth oxide doped $CeO_2$, alkaline earth oxide doped $CeCO_2$ or a perovskite, the corresponding useful porous/dense/porous electrolyte configuration is obtained.

(c) Similarly, when Examples 1(a), 2(a) and 3(a) is repeated except that the nickel oxide is replaced with an equivalent amount of cobalt oxide, iron oxide, ruthenium oxide, or mixtures thereof, the corresponding useful porous/dense/porous electrolyte configuration is obtained.

EXAMPLE 4

Ag CATHODE (a) Similarly, fine Ag particles are prepared from silver nitrate. Silver nitrate crystals are dissolved in water. The solution is then impregnated in the porous YSZ side of the sintered cells. After drying in air, the cells are heated up to 800° C. to form fine Ag particles.

(b) Similarly, when Examples 1(a), 2(a), 3(a), and 4(a) are repeated except that YSZ is replaced with an equivalent amount $Yb_2O_3$-doped Zirconia, $Sc_2O_3$-doped Zirconia, rare earth oxide doped $CeO_2$, alkaline earth oxide doped $CeCO_2$ or a perovskite, the corresponding useful porous/dense/porous electrolyte configuration is obtained.

(c) Similarly, when Examples 1(a), 2(a), 3(a), and 4(a) are repeated except that the nickel oxide is replaced with an equivalent amount of cobalt oxide, iron oxide, ruthenium oxide, or mixtures thereof, the corresponding useful porous/dense/porous electrolyte configuration is obtained.

EXAMPLE 5

ANODE PREPARATION (a) After preparing the cathode, the cells are heated up to 800° C. in hydrogen to reduce NiO to Ni metal. After reduction, the cells are ready for testing.

(b) Similarly, when Examples 1(a), 2(a), 3(a), 4(a), and 5(a) are repeated except that YSZ is replaced with an equivalent amount $Yb_2O_3$-doped zirconia, $Sc_2O_3$-doped zirconia, rare earth oxide doped $CeO_2$, alkaline earth oxide doped $CeO_2$ or a perovskite, the corresponding useful porous/dense/porous electrolyte configuration is obtained.

(c) Similarly, when Examples 1(a), 2(a), 3(a), 4(a), and 5(a) are repeated except that the nickel oxide is replaced with an equivalent amount of cobalt oxide, iron oxide, ruthenium oxide, or mixtures thereof, the corresponding useful porous/dense/porous electrolyte configuration is obtained.

EXAMPLE 6

CHARACTERIZATION AND FUEL CELL TESTING:

(A) X-RAY DIFFRACTION (a) X-ray diffraction is used to verify the structures and phases of YSZ, NiO, and LSM. The YSZ has cubic $CaF_2$-type structure. No reaction between NiO and YSZ is observed. Also, the LSM particles obtained from the nitrates have the same perovskite structure as is reported in the literature.

(b) Similarly, when Examples 1(a), 2(a), 3(a), 4(a), 5(a), and 6(a) are repeated except that YSZ is replaced with an equivalent amount $Yb_2O_3$-doped zirconia, $Sc_2O_3$-doped zirconia, rare earth oxide doped $CeO_2$, alkaline earth oxide doped $CeO_2$ or a perovskite, the corresponding useful porous/dense/porous electrolyte configuration is obtained.

(c) Similarly, when Examples 1(a), 2(a), 3(a), 4(a), 5(a), and 6(a) are repeated except that the nickel oxide is replaced with an equivalent amount of cobalt oxide, iron oxide, ruthenium oxide, or mixtures thereof, the corresponding useful porous/dense/porous electrolyte configuration is obtained.

EXAMPLE 7

(B) SEM

SEM is used to determine the thickness of YSZ coating and microstructure of cathode, electrolyte, and anode. The microstructures in FIG. 2 show that the coated YSZ is fully dense and has a thickness of about 20 μm. The bonding between electrodes and YSZ is acceptable, and higher than that of the art. Also, very fine Pt, LSM, and Ag particles are homogeneously distributed in porous YSZ (see FIGS. 3, 4 and 5).

EXAMPLE 8

FUEL CELL TESTING (a) The cells are tested using the set-up designed and built. FIG. 11 is a graphic representation of the fuel cell testing apparatus 20. A fuel cell (8) is attached to two alumina tubes (4, 4A) each of 2.54 cm diameter by multiple alumina tube supports 1A, 1B, 1C and 1D. Fuel (hydrogen) (13) and oxidant (11) (air or oxygen) are supplied through the ends of the alumina tubes (4, 4A). A mechanical load is applied through an external spring (2) against steel ring (3) to ensure good sealing. Silver foil (6) and mica sheets (9) are used as gaskets. Super alloy fittings 7 and 7A are flanged to provide the necessary seal configuration. Silver mesh current collectors are attached to cathode and anode. After assembly the entire set-up is inserted into furnace (5 in dashed outline) to the desired operational temperatures as monitored by thermocouple 10. Electrical circuit 12 measures and/or uses the electrical current produced.

Humidified $H_2$ is selected as the fuel. Either air or pure oxygen is used as the oxidant. The cells are tested at 800° C. All cells tested have identical electrolyte and anode structures, but the cathode is of two types of structures, with and without a porous YSZ layer. The results of cell testing given in FIGS. 6A and 6B show that the cell without porous YSZ has an open circuit voltage of 1.06 V and a maximum power density of about 0.5 W/cm$^2$ using pure oxygen as an oxidant at 800° C. However, after coating a layer of porous YSZ on top of dense YSZ and impregnating with fine Pt or LSM particles on the cathode side of the cell has an open circuit voltage of 1.08 V and a maximum power density ~1 W/cm$^2$ using pure oxygen as an oxidant at 800° C. (FIGS. 7A and 7B and FIGS. 8A and 8B). Improved results are also obtained with air as the oxidant. That is to say, by using a porous layer with impregnated electrodes, the power density is more than doubled.

(b) Similarly, when Examples 1(a), 2(a), 3(a), 4(a), 5(a), 6(a), and 8(a) are repeated except that YSZ is replaced with an equivalent amount $Yb_2O_3$-doped zirconia, $Sc_2O_3$-doped zirconia, rare earth oxide doped $CeO_2$, alkaline earth oxide doped $CeO_2$ or a perovskite, the corresponding useful porous/dense/porous electrolyte configuration is obtained.

(c) Similarly, when Example 1(a), 2(a), 3(a), 4(a), 5(a), 6(a), and 8(a) are repeated except that the nickel oxide is replaced with an equivalent amount of cobalt oxide, iron oxide, ruthenium oxide, or mixtures thereof, the corresponding useful porous/dense/porous electrolyte configuration is obtained.

While only a few embodiments of the invention have been shown and described herein, it is apparent to those skilled in the art that various modifications and changes can be made in the design and materials to produce improved devices, fuel cells, catalysts or sensors having enhanced TPBs and the process of production thereof without departing from the spirit and scope of the present invention. All such modifications and changes are intended to be carried out thereby.

We claim:

1. An improved electrode electrolyte structure having an enhanced three phase boundary (TPB) length for use as a fuel cell, a catalyst or a sensor, wherein said structure comprises:

A. a substrate layer consisting of a dense electrolyte material;

B. a porous surface layer of said dense electrolyte material over the dense electrolyte substrate layer;

C. an electrocatalyst material on and within the porous surface layer of electrolyte, wherein the electrocatalyst material is continuous on the surface of the porous electrolyte, creating enhanced TPBs with gas present, and D. said structure is integrally connected or attached to a porous anode.

2. The improved electrode structure of claim 1 wherein the dense electrolyte substrate is between about 1 and 1000 micron thick, and the porous surface layer is between about 1 and 10,000 micron.

3. The improved electrode structure of claim 2 wherein the dense electrolyte substrate in the center is present in a thickness of between about 2 and 500 microns.

4. The improved electrode structure of claim 1 wherein the dense electrolyte structure and the porous electrolyte structure are yttria-stabilized zirconia, ceria, oxygen ion conducting solid electrolyte or combinations thereof, and the electrocatalyst material for the electrode (cathode) is selected from silver; platinum; palladium; rhodium; iridium; ruthenium;

$(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90%, $PrO_{1.83}$ of 10–60% and $ZrO_2$ of 0 to 50%;

$TbO_2$ being 35 to 40%, doped with YSZ;

$SnO_2$ being 0 to 20% doped with $In_2O_3$;

$ZrO_2$ being 0 to 40% doped $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

5. The improved electrode/electrolyte structure of claim 1 wherein the electrolyte is yttria-stabilized zirconia (YSZ).

6. The improved electrocatalyst of claim 1 wherein height of the thickness of the porous layer is designated h, the thickness of the dense electrolyte substrate is designated as d, the length of a segment of the dense electrolyte substrate is designated as L, and the width of the porous layer hump is designated as w, and that the effective fractional porosity (EFP) of the porous layer is determined by the following equation:

$$EFP = \frac{L-w}{L} \times 100$$

and that EFP is between about 5% and 80%.

7. The improved electrode structure of claim 6 wherein the dense electrolyte substrate is between about 1 and 1000 micron thick, and the porous surface layer is between about 1 and 10000 micron.

8. The improved electrode structure of claim 7 wherein the dense electrolyte substrate is present in between 2 and 500 microns.

9. The improved electrode structure of claim 6 wherein the dense electrolyte structure and the porous electrolyte structure are yttria-stabilized zirconia, and the electrocatalyst material is selected from silver; platinum;

$(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90% $PrO_{1.83}$ of 10–60% and $ZrO_2$ of 0 to 50%;

$TbO_2$ being 35 to 40% doped with YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

10. The improved structure of claim 1 for use as a component of a fuel cell, sensor, gas separator, gas pump, or methane reformation catalyst.

11. An improved method to produce an electrode structure having an enhanced three phase boundary (TPB) for use as a fuel cell, a catalyst, or a sensor, wherein said method comprises:

A. obtaining first a transition metal oxide having a particle size of about 200 mesh or smaller;

B. obtaining second a mixed metal compound having a particle size of about 50 mesh or smaller;

C. combining the metal oxide of step A and mixed metal compound of step B;

D. pressing the combination of the mixed powders of step C, to produce a self-contained solid object at a pressure of between about 5,000 and 50,000 psig at ambient temperature;

E. coating the surface of the solid object of step D with an aqueous or non-aqueous slurry of an electrolyte material;

F. pressing the coated object of step E at a pressure between about 5000 and 50000 psig;

G. optionally further coating the coated object of step F one or more times with an aqueous or a nonaqueous slurry of carbon and electrolyte powder of step B;

H. drying the coated object of step E or step G;

I. pressing the object of step F at between about 5,000 and 50,000 psig;

J. slowly heating the object of step I up to between about 600° and 1000° C. at a rate of between about 10° C. and 60° C. per hr;

K. maintaining the object of step J at between about 600° and 1000° C. for between about 1 and 60 hr to remove carbon present creating the porous surface;

L. heating further the object of step K and sintering between about 1400° and 1600° C. for between about ½ and 3 hr;

M. slowly cooling the object of step L to ambient conditions producing an object having three regions each having a different structure and composition, which regions comprise:

(i) an upper surface porous layer of the electrolyte material;
(ii) a central fully dense layer of the electrolyte material; and
(iii) a lower layer of a two phase ceramic of metal oxide and electrolyte material; and N. introducing an electrocatalyst into the pores of the object of step M as an aqueous solution of salts or a nonaqueous solution of salts and heating to about 700° to 1000° C. to remove liquid and to form the electrocatalyst as a continuous phase having an enhanced TPB length and not blocking the entire porous electrolyte surface.

12. The method of claim 11 wherein the method further includes step O:

O. contacting the object of step N with hydrogen to reduce the metal oxide residue of step A at between about 700° and 1000° C. for between about ½ and 24 hr.

13. The method of claim 11 wherein the electrocatalyst material is selected from silver; platinum; palladium; rhodium; iridium; ruthenium;

$(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90%, $PrO_{1.83}$ of 10–60% and $ZrO_2$ of 0 to 50%;

$TbO_2$ being 35 to 40%, doped with YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

14. The method claim 12 wherein porous electrolyte of the electrode material is yttria-stabilized zirconia, and the electrocatalyst material is selected from silver; platinum; palladium; rhodium; iridium; ruthenium;

$(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$ZrO_2$, having composition ratios of $In_2O_3$ of 0–90%, $PrO_{1.83}$ of 10–60% and $ZrO_2$ of 0 to 50%;

$TbO_2$ being 35 to 40%, doped with YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

15. The method claim 11 wherein porous electrolyte of the electrode material is yttria-stabilized zirconia, and the electrocatalyst material is selected from silver; platinum; palladium; rhodium; iridium; ruthenium;

$(La_{1-x}Sr_x) MnO_3$, wherein x is 0 to 0.5;

$(La_{1-x}Sr_x) CoO_3$, wherein x is 0 to 0.6;

$(La_{1-x}Sr_x)(Co_{1-y}Fe_y)O_3$, wherein x is 0 to 0.4 and y is 0 to 0.8;

$In_2O_3$—$PrO_{1.83}$—$Zr_{O2}$, having composition ratios of $In_2O_3$ of 0–90%, $PrO_{1.83}$ of 10–60% and $ZrO_2$ of 0 to 50%;

$TbO_2$ being 35 to 40%, doped with YSZ;

$SnO_2$ being 0 to 20% doped with $In_2O_3$;

$ZrO_2$ being 0 to 40% doped with $In_2O_3$;

$Sm_{0.5} Sr_{0.5} CoO_3$;

$La_{0.6}Ca_{0.4}MnO_3$;

$Y_{1-x}Ca_xFeO_3$, wherein x is 0 to 1;

$SrCo_{1-x}Fe_xO_3$, wherein x is 0.2 to 0.8;

$TiO_2$ being 0–30% doped with YSZ; or mixtures thereof.

16. The electrode structure for use as an improved fuel cell, catalyst or sensor produced by the method of claim 11.

17. The electrode structure for use as an improved fuel cell, catalyst or sensor produced by the method of claim 12.

18. The improved structure of claim 4 for use as an improved fuel cell, catalyst, sensor, gas separator or gas pump.

19. The improved structure of claim 6 for use as an improved fuel cell, catalyst, sensor, gas separator or gas pump.

20. The improved structure of claim 9 for use as an improved fuel cell, catalyst, sensor, gas separator or gas pump.

* * * * *